(12) United States Patent
Furman et al.

(10) Patent No.: US 6,393,062 B1
(45) Date of Patent: May 21, 2002

(54) METHODS AND CIRCUITS FOR GENERATING A PREEMPHASIS WAVEFORM

(75) Inventors: Bruce M. Furman, Palo Alto; Charles M. Allen, Sunnyvale, both of CA (US)

(73) Assignee: Maxim Integrated Products, Inc., Sunnyvale, CA (US)

( * ) Notice: Subject to any disclaimer, the term of this patent is extended or adjusted under 35 U.S.C. 154(b) by 0 days.

(21) Appl. No.: 09/264,803

(22) Filed: Mar. 9, 1999

Related U.S. Application Data
(60) Provisional application No. 60/101,316, filed on Sep. 21, 1998.

(51) Int. Cl.$^7$ ................................................. H04B 3/00
(52) U.S. Cl. ........................................ 375/252; 375/295
(58) Field of Search ................................ 375/256, 257, 375/258, 295, 286, 288, 264, 291, 259, 289; 327/108, 262, 114, 264, 126, 378, 127, 140, 172, 134, 179, 133, 130; 326/26, 28, 27, 30, 82, 83, 86

(56) References Cited

U.S. PATENT DOCUMENTS

| | | | |
|---|---|---|---|
| 4,857,906 A | * 8/1989 | Conner | 345/97 |
| 5,198,818 A | 3/1993 | Samueli et al. | 341/144 |
| 5,459,749 A | 10/1995 | Park | 375/286 |
| 5,528,166 A | * 6/1996 | Iikbahar | 326/27 |
| 5,559,441 A | * 9/1996 | Desroches | 324/647 |
| 5,600,274 A | * 2/1997 | Houston | 327/262 |
| 5,642,067 A | * 6/1997 | Grace | 327/134 |
| 5,798,668 A | * 8/1998 | George | 327/538 |
| 5,818,269 A | * 10/1998 | Brown et al. | 327/108 |
| 5,901,179 A | 5/1999 | Urabe et al. | 375/259 |
| 5,917,340 A | 6/1999 | Manohar et al. | 326/82 |
| 5,936,450 A | * 8/1999 | Unger | 327/237 |
| 6,087,847 A | * 7/2000 | Mooney et al. | 326/30 |
| 6,157,215 A | * 12/2000 | Gabara et al. | 326/83 |

* cited by examiner

*Primary Examiner*—Chi Pham
*Assistant Examiner*—Emmanuel Bayard
(74) *Attorney, Agent, or Firm*—Oppenheimer Wolff & Donnelly LLP

(57) ABSTRACT

The present invention overcomes ISI by precompensating for the anticipated high-frequency energy losses in the transmission media. This precompensation is accomplished using a preemphasis waveform, i.e., driving the differential signal to a value larger than normal on a signal edge. Preemphasis increases the slew rate of edges inside data with a lot of transitions relative to data with fewer transitions, thereby compensating for the low-pass effects of the transmission cable. The present invention further contemplates adaptive control for ensuring that varying operating conditions do not effect preemphasis waveform generation. The first approach involves tracking the operation of a replicate driver for each main driver and adaptively controlling each main driver depending upon feedback from the replicate driver. A second approach, that is both more complicated and more effective, involves measuring the signal and the line impedance at the output of the main driver and adaptively controlling the main driver in response.

30 Claims, 6 Drawing Sheets

METHODS AND CIRCUITS FOR GENERATING A PREEMPHASIS WAVEFORM

This application claims benefit to U.S. Provisional No. 60/101,316 filed Sep. 21, 1998.

TECHNICAL FIELD

The present invention is related to the design and operation of serial communication devices. More specifically, the present invention teaches a variety of transmitter devices that operate in such a manner as to improve performance by compensating for high frequency line losses during transmission. For example, the preemphasis circuitry of the present invention extends the distance and increases the data rate of reliable communication by reducing intersymbol interference caused by long cables.

BACKGROUND ART

Serial communication is perhaps the simplest possible communication available, transferring only one bit at a time. Extraordinarily common, multiple serial communication standards (such as RS-232, RS-422, and RS-485) have developed over time. These standards specify the interface (connectors, pin functions, voltages, logic states, etc.) between two or more devices (e.g., a modem and a computer) so they may exchange data. RS-485 is a differential communications standard similar to RS-422, but with additional specifications so that multiple transmitters and receivers may share a single line. For example, the published RS-485 standard provides that RS-485:

1) is a differential mode serial data standard;
2) is capable of 32 transmitters and 32 receivers, maximum;
3) can operate over a maximum cable length of 1200 meters;
4) can handle a maximum bit rate of 10 Megabits/second;
5) has transmit levels of +/−1.5V minimum; and
6) must withstand voltage levels up to 12V.

The standard is, not surprisingly, deviated from in practice. For example, manufacturers design and sell RS-485 transmitters and receivers that are compatible with the standard, but have better performance.

FIG. 1 illustrates an RS-485 network 100 of the prior art. The RS-485 network 100 includes a plurality of transmitters 102 (often referred to as "drivers") and receivers 104 coupled in parallel across a wire pair 106. A repeater circuit 108 couples the network 100 to a second RS-485 network 200. The network 100 further includes termination devices 110 which present a known load to the transmitters 102 and serves to minimize signal reflection across the network 100. Only one transmitter 102 at a time may drive a differential signal (Y–Z) across the wire pair 106. (Note that the labels Y and Z are used herein to indicate both the differential signal pair and the channel carrying this signal. The appropriate meaning will be apparent from the context.)

FIGS. 2–4 illustrate one possible waveform for the differential signal pair present on channels Y and Z. FIG. 2 shows a $Y_{ideal}$ signal, FIG. 3 shows a $Z_{ideal}$ signal, and FIG. 4 shows their differential $Y_{ideal}-Z_{ideal}$. As will be appreciated, the waveforms of FIGS. 2–4 are merely ideal representations. In practice, limitations in circuit design and circuit components, as well as losses due to line impedance result in the actual waveforms being mere approximations of square waves.

The distributed series resistance and the parallel capacitance present on the wire pair 106 cause it to have a low pass frequency transfer characteristic. These low-pass filter characteristics distort and dampen signals transmitted upon the wire pair 106. The low pass filter characteristic causes "Intersymbol Interference" or "ISI," which is a variation in the propagation delay of a bit pattern down the cable depending upon the particular sequence of the data that preceded it. Because of ISI, a direct trade-off must be made between cable length and bit rate on the one hand, and an acceptable error rate on the other. Specifically, increasing the cable length or speeding up the bit rate will, due to the ISI, result in an increase in the bit error rate.

In order to overcome these limitations, network designers take actions like coupling two different networks together with a device such as the repeater circuit 108. The repeater circuit 108 mirrors and amplifies received signals in order to further propagate them, thereby increasing the possible cable length and/or transmission speed for the RS-485 network without increasing the bit error rate. The repeater circuit 108 is typically a bi-directional device. While solutions like adding the repeater circuit 108 are effective in their own way, they increase cost and complexity of the RS-485 network and it would be preferable to enhance performance of communications networks without the use of expensive, complex repeaters.

DISCLOSURE OF THE INVENTION

The present invention overcomes ISI by precompensating for the anticipated high-frequency energy losses in the transmission media. This precompensation is accomplished using a preemphasis waveform, i.e., driving the differential signal to a value larger than normal on a signal edge. Preemphasis increases the slew rate of edges inside data with a lot of transitions relative to data with fewer transitions, thereby compensating for the low-pass effects of the transmission cable. The present invention further contemplates various adaptive control schemes for ensuring that varying operating conditions do not effect preemphasis waveform generation. The first approach involves tracking the operation of a replicate driver for each main driver and adaptively controlling each main driver depending upon feedback from the replicate driver. A second approach, that is both more complicated and more effective, involves measuring the signal and the line impedance at the output of the main driver and adaptively controlling the main driver in response.

BRIEF DESCRIPTION OF THE DRAWINGS

Prior Art

Prior Art

BEST MODES FOR CARRYING OUT THE INVENTION

The present invention overcomes ISI by precompensating for the anticipated high-frequency energy losses in the transmission media. This precompensation is accomplished using a preemphasis waveform, i.e., driving the differential signal to a value larger than normal on a signal edge. Preemphasis increases the slew rate of edges inside data with a lot of transitions relative to data with fewer transitions, thereby compensating for the low-pass effects of the transmission cable.

Figure 1:
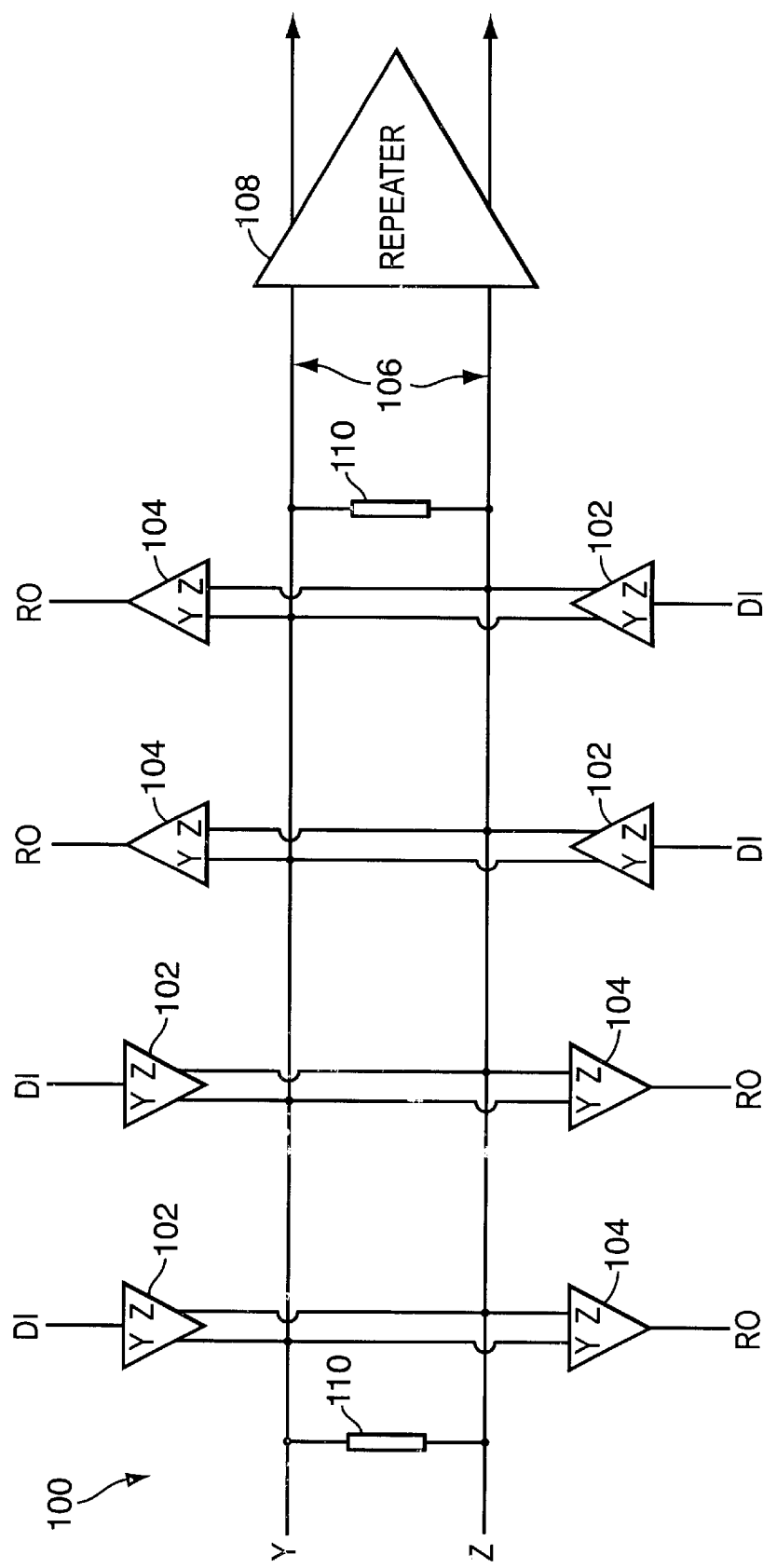
FIG. 1 is a schematic of an RS-485 network.
Figure 2:
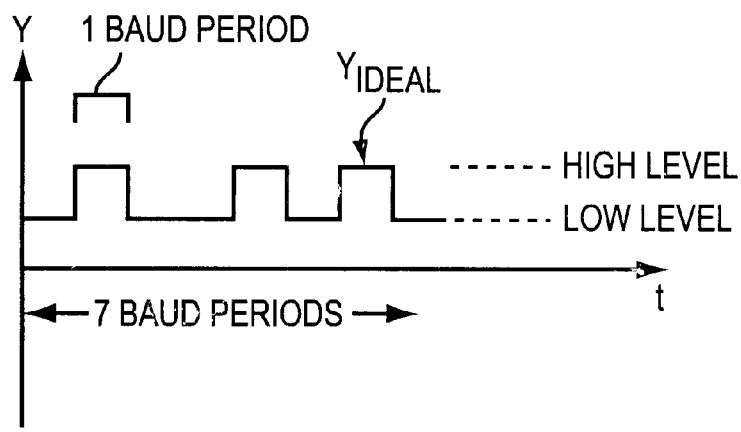
FIGS. 2–4 are plots illustrating one possible waveform for a differential signal pair Y and Z.
Figure 3:
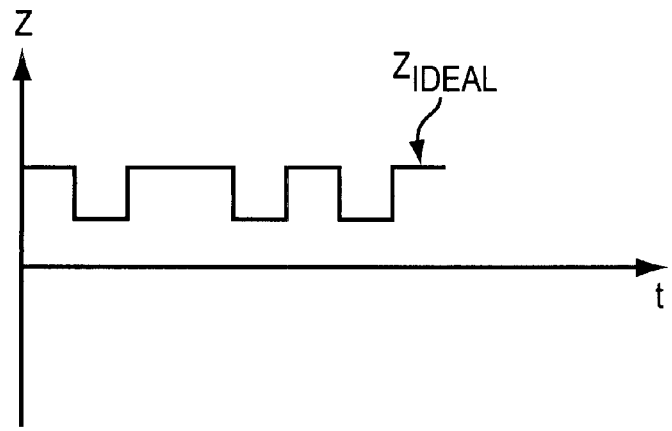
Figure 4:
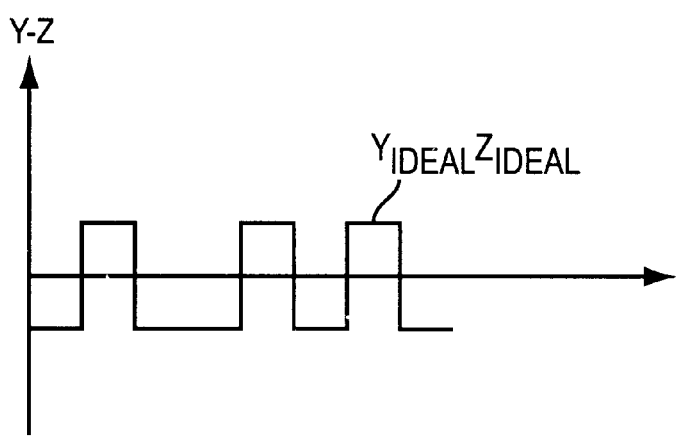
Figure 5A:
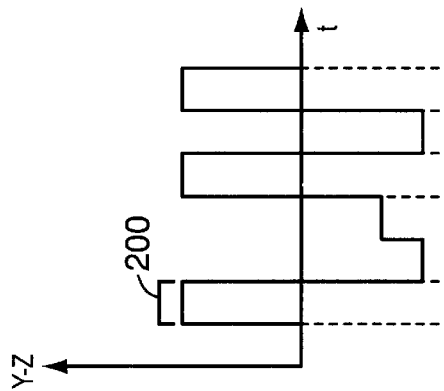
FIGS. 5a, 6a and 7a are plots showing several possible preemphasis waveforms in accordance with the present invention.
Figure 6A:
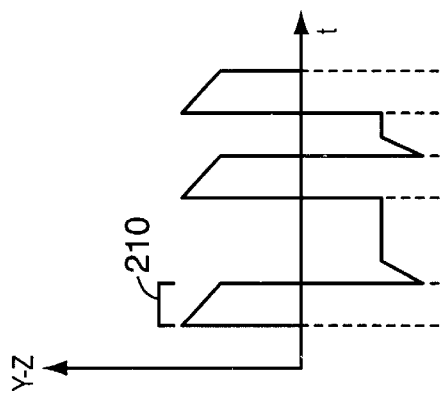
Figure 7A:
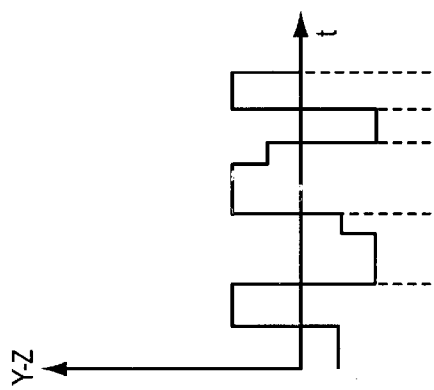

FIGS. 5a, 6a, and 7a illustrate three different possibilities for preemphasis waveforms as contemplated by the present invention. These examples are by no means exclusive, although the steep-trailing edge of FIG. 5a is preferred in many applications. It will also be appreciated that the length of the preemphasis waveforms can be varied as necessary or preferred for specific applications. For example, a greater cable length may require a longer preemphasis waveform.

Figure 5B:
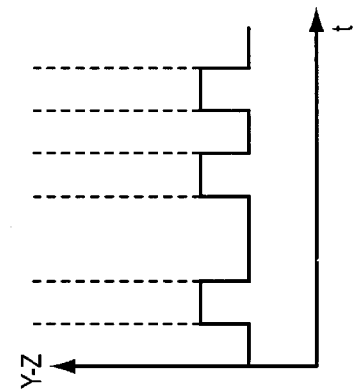
FIGS. 5b, 6b, and 7b are plots showing driver input signals corresponding to preemphasis waveforms of FIGS. 5a, 6a and 7a, respectively.
Figure 6B:
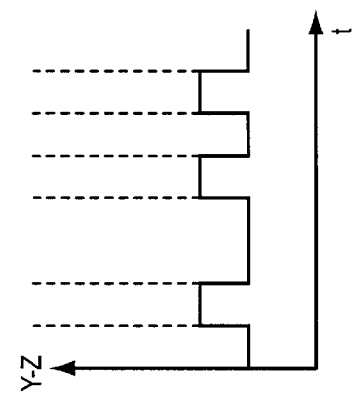
Figure 7B:
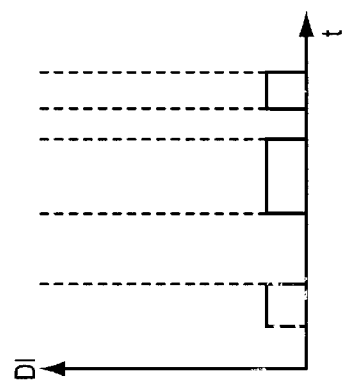

FIG. 5a illustrates an idealization of a preemphasis waveform 200 of about one baud period that has a steep-trailing edge. Once the preemphasis waveform is complete, the signal drops down to a normal level until the data changes. FIG. 6a illustrates an idealization of a preemphasis waveform 210 that of about one baud period that has a soft-trailing edge. Similar to FIG. 5a, once the preemphasis waveform 210 is complete, the signal drops down to a normal level until the data changes. FIG. 7a illustrates a preemphasis waveform 200 that is active for a period greater than the baud period. This would be necessary, e.g., when the attenuating effects of the communications cable are severe. For further clarity, FIGS. 5b, 6b, and 7b illustrate the driver input (DI) signals that would cause a transmitter to generate the preemphasis waveforms of FIGS. 5a, 6a, and 7a, respectively.

Figure 8:
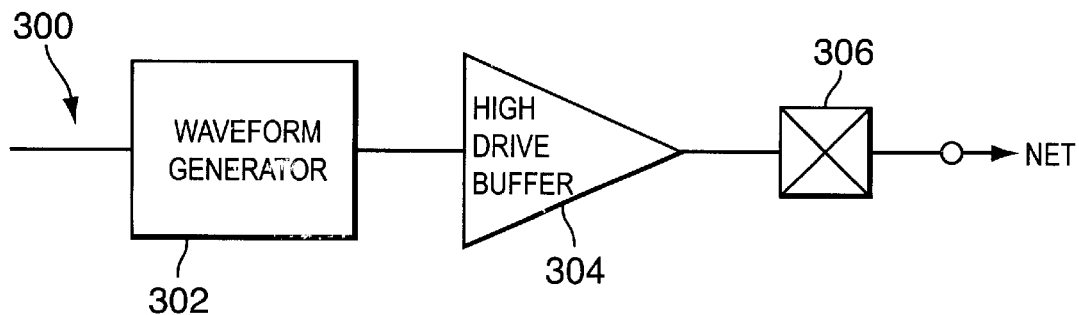
FIG. 8 is a block diagram showing a portion of an analog RS-485 transmitter in accordance with one embodiment of the present invention.

Turning next to FIG. 8, an analog implementation of a transmitter 300 in accordance with one embodiment of the present invention will now be described. The transmitter 300 includes a waveform generator 302, a high drive buffer 304, and an output pin 306 for coupling the signal to the RS-485 network. The waveform generator 302 generates waveforms such as those shown in FIGS. 5–7 in order to control the high drive buffer 304. The high drive buffer 304 must be powerful enough and fast enough to drive the load of the RS-485 network. In certain embodiments, the waveform generator 302 is designed to provide a fixed amount of preemphasis, possibly optimized for a fixed baud rate. In other embodiments, the waveform generator 302 is adjustable in order to obtain a desired amount of preemphasis (10% of the baud period or 110% of the baud period) or to accommodate a range of data rates.

In practice, speed limitations come into play in the design of transmitter 300, particularly with respect to design of the high drive buffer 304. For example, using 3-micron circuit technology provides lower speed circuits that can withstand higher voltage conditions. In contrast, using 1.5-micron circuit technology provides higher speed circuits that typically cannot withstand the higher voltage conditions of the 3-micron circuitry.

Figure 9:
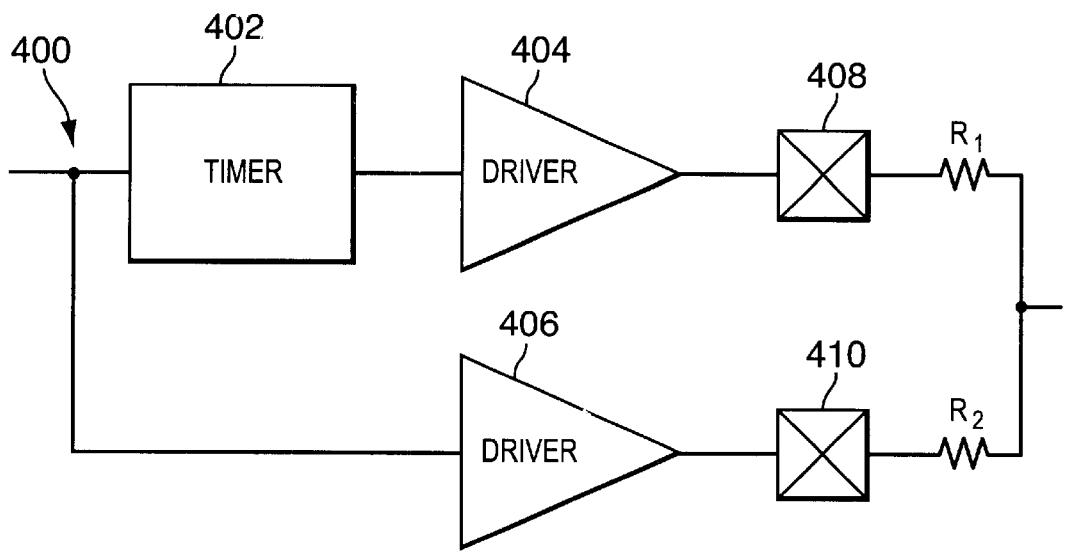
FIG. 9 is a block diagram showing a portion of a first digital RS-485 transmitter in accordance with another embodiment of the present invention.
Figure 10:
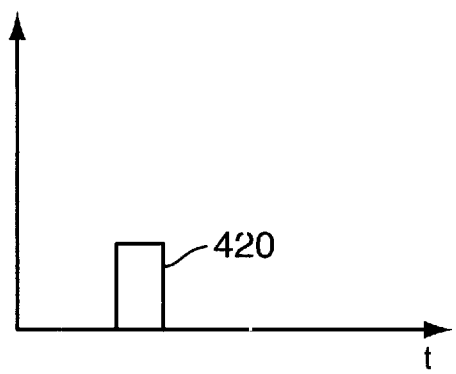
FIGS. 10–11 are plots illustrating the preemphasis and standard waveforms generated by the first digital RS-485 transmitter of FIG. 9.
Figure 11:
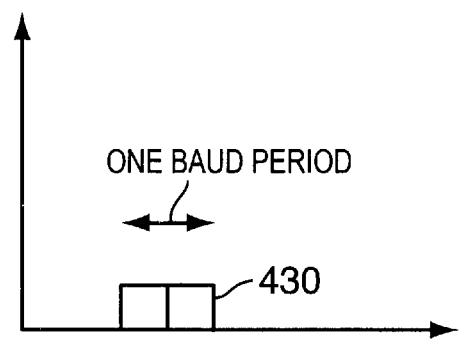

Turning next to FIG. 9, a first digital implementation of a transmitter 400 in accordance with another embodiment of the present invention will now be described. The transmitter 400 includes a timer 402, a pair of drivers 404 and 406, two output pads 408 and 410, and two external resistors $R_1$ and $R_2$. The timer 402 sets the preemphasis period and controls the driver 404. For reference sake, a preemphasis waveform 420 of about one-half a baud period generated at the output of the driver 404 is illustrated in FIG. 10. The driver 406 generates a standard waveform 430 illustrated in FIG. 11. The timer 402 and drivers 404 and 406 can all be integrated onto a single IC device. However, mixing of the two signals to generate the proper output requires external resistors $R_1$ and $R_2$, thus there is a requirement for two output pins 408 and 410. As a result, the transmitter 400 requires an extra output pin and is not in accordance with the RS-485 standard. Nonetheless, the transmitter 400 is suitable for applications that can be adapted to the additional pin and the external resistors.

Figure 12:
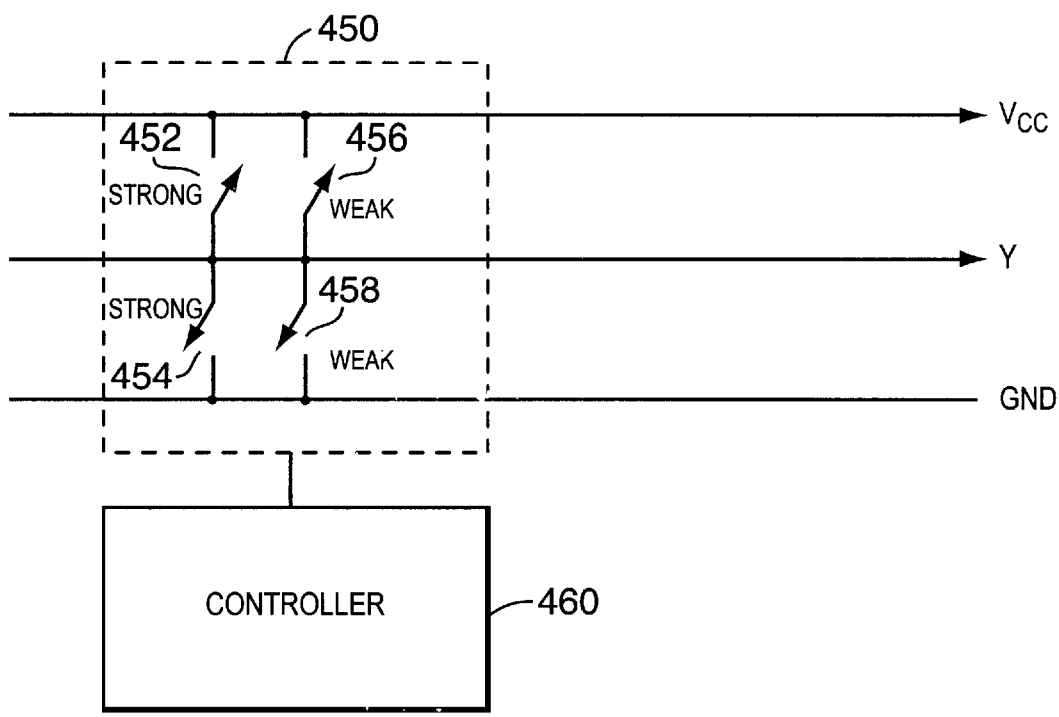
FIG. 12 is a block diagram showing a portion of a second digital RS-485 transmitter in accordance with yet another embodiment of the present invention.

Turning next to FIG. 12, a switching driver 450 suitable for driving a single channel of the differential pair will now be described. The switching driver 450 includes first and second strong switches 452 and 454, first and second weak switches 456 and 458, and a controller 460 operable to control operation of the switches. In preferred embodiments, these switches are MOSFETs. Both the first strong switch 452 and the first weak switch 456 are arranged to couple channel Y to a voltage supply $V_{cc}$. Both the second strong switch 454 and the second weak switch 458 are arranged to couple channel Y to a common ground reference.

As will be appreciated, the strength or magnitude of the voltage on channel Y is directly related to the states of the switching driver switches. For example, with both the strong switch 454 and the weak switch 458 open, high logic level states of three different magnitudes can be obtained on channel Y. Namely, with both the strong switch 452 and the weak switch 456 closed, the voltage on channel Y is at its greatest. With the strong switch 452 closed and the weak switch 456 open, the voltage on channel Y is at an intermediate magnitude high logic level. With the strong switch 452 open and the weak switch 456 closed, the voltage on channel Y is at its lowest magnitude high logic level. To achieve a low logic level on channel Y, both the weak switch 456 and the strong switch 452 must be open and at least one of the strong switch 454 and the weak switch 458 must be closed coupling channel Y to ground.

Thus to generate a waveform having a preemphasis and then a standard magnitude, the controller 460 can operate the various switches in several ways. In certain embodiments, the preemphasis magnitude is obtained by closing both the strong switch 452 and the weak switch 456. As this produces the greatest magnitude high logic level, the lesser magnitude standard waveform can be generated by opening at least one of the strong switch 452 and the weak switch 456.

In alternative embodiments, the desired preemphasis magnitude is generated by closing just the strong switch 452, leaving the weak switch 452 open. The standard waveform is generated by opening the strong switch is 452 and closing the weak switch 456.

To avoid line jitter, closing and opening of the switches may not be synchronous, but instead may be slightly offset and/or overlapping. These features must be selected based upon the network requirements and the characteristics of the utilized devices.

It is important to preserve, from baud period to baud period, a fixed ratio between the magnitude of the preemphasis waveform and the standard waveform. For example, as impedance of the line gets higher, it becomes easier to drive the line. This means that the strength of both the strong and weak switches increase. However, these typically increase in a way that does not preserve a constant ratio between the two. Additionally, manufacturing inconsistencies and temperature and supply voltage fluctuations cause inconsistent behavior in the switches. The present invention contemplates at least two possible approaches for controlling the resulting variations. The first approach involves tracking the operation of a replicate driver for each main driver and adaptively controlling each main driver depending upon feedback from the replicate driver. A second approach, that is both more complicated and more effective, involves measuring the signal and the line impedance at the output of the main driver and adaptively controlling the main driver in response.

Figure 13:
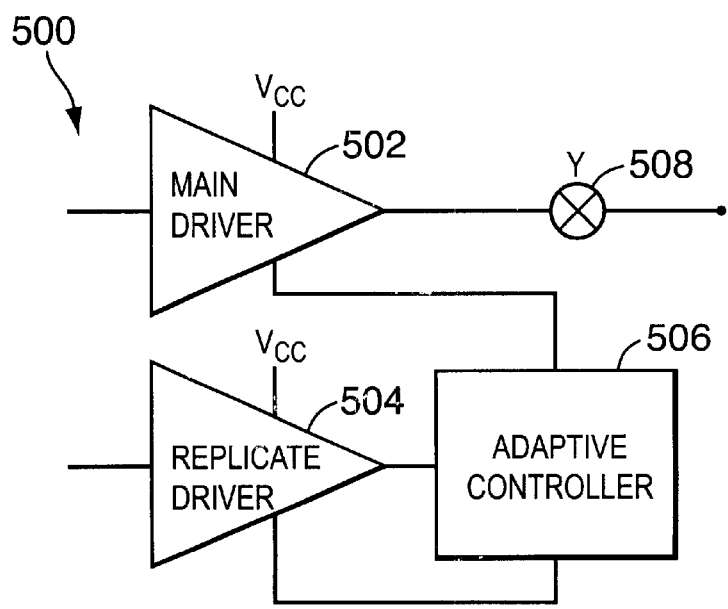
FIG. 13 is a block diagram showing a portion of a third digital RS-485 transmitter having replicate driver and an adaptive controller in accordance with still another embodiment of the present invention.

FIG. 13 illustrates a transmitter 500 in accordance with yet another embodiment of the present invention. The transmitter 500 includes a main driver 502, a replicate driver 504, an adaptive controller 506, and an output pin 508 corresponding to the channel Y. The main driver 502 is similar to the switching device 450 of FIG. 12. However, the switches in main driver 502 are variable such that their strengths are controllable by the adaptive controller 506. The replicate driver 504 is a scaled down version of the main driver 502; i.e., these switches are much smaller but are formed such that the operating conditions (e.g., temperature, supply voltage, etc.) on the replicate driver 504 and the main driver 502 are similar.

The adaptive controller 506 is arranged to monitor the replicate driver and simultaneously control both the replicate driver and the main driver in an adaptive manner to compensate for the operating conditions. In essence, the replicate driver 504 combined with the adaptive controller 506 provides a weaker, simulated main driver (e.g., 50 times weaker) and a simulated load (e.g., 50 times less). The operation of the replicate driver 504 mirrors the real driver, and asynchronous with the output, the levels of the replicate drivers can be measured and converted into a digital code suitable for adjusting the main switches. This update can be done a rate that is convenient and resource efficient. Of course, the update must be performed in a manner that doesn't effect the main driver 502 in the middle of operation. Thus the adaptive controller 506 requires synchronization circuitry for aligning control with the main driver 502 operation. The Applicants' current implementation of the adaptive controller 506 changes the strength of the main driver 502 on code edges to avoid strength changes when the data is not changing, but other strategies can be implemented for synchronization purposes.

Note that the adaptive controller 506 is unable to compensate for impedance changes in the cable. However, because the adaptive controller 506 is not sensing cable impedance (which would require sampling the cable at the communications baud rate), the adaptive controller 502 need only sample the replicate driver 504 at a rate sufficient to sense changes in the other operating conditions (temperature, etc.). This greatly simplifies the sampling circuitry, making it more space and cost efficient and easier to design.

Figure 14:
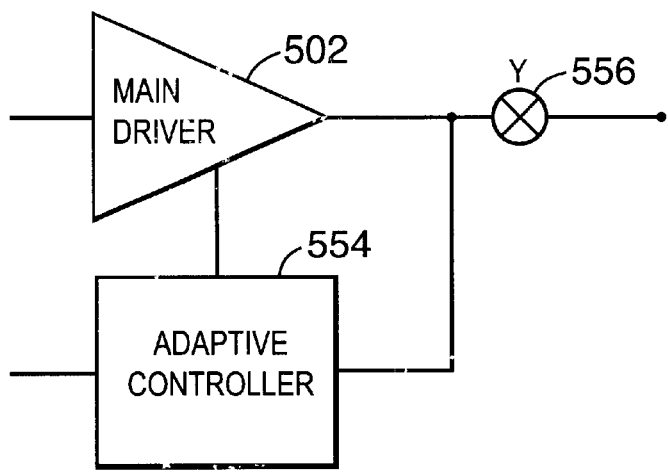
FIG. 14 is a block diagram showing a portion of a fourth digital RS-485 transmitter having an adaptive controller sensing the output of the main driver in accordance with a further embodiment of the present invention.

With reference to FIG. 14, still another transmitter 550 in accordance with the present invention will now be described. The transmitter 550 includes a main driver 552, an adaptive controller 554, and an output pin 556. Unlike the transmitter 500 of FIG. 13, the transmitter 550 has the capability in its adaptive controller 554 to directly measure the output signal Y in real time. In response to this real-time feedback, the adaptive controller 554 is able to control the main driver 502 directly, thereby compensating for any error causing effects including variations in cable impedance.

Although only a few embodiments of the present invention have been described in detail herein, it should be understood that the present invention could be embodied in many other specific forms without departing from the spirit or scope of the invention.

For example, the preemphasis waveform could be "bootstrapped" to a voltage level greater than the voltage supply through the use of external energy storage capacitors. This is an effective method, but similar to the design of FIG. 9, extra pins would be required thus making it incompatible with RS-485. Additionally, the requirement of additional components in the form of capacitors may make this an unattractive solution.

Therefore, the present examples and embodiments are to be considered as illustrative and not restrictive, and the invention is not to be limited to the details given herein, but may be modified within the scope of the appended claims.

We claim:

1. A method for generating a binary communication signal suitable for use over a communications cable having low-pass filter characteristics, the method comprising the steps of:
    generating a preemphasis waveform for a first time period, the preemphasis waveform having a preemphasis magnitude;
    applying the preemphasis waveform to the communications cable;
    generating a standard waveform for a second time period substantially immediately following generation of the preemphasis waveform, the standard waveform having a standard magnitude, the standard magnitude being within a communications specification, the preemphasis magnitude being larger than the standard magnitude;
    applying the standard waveform to the communications cable,
    wherein the binary communications signal includes the preemphasis waveform and the standard waveform, and the first time period being on the order of a baud period defined by the communications specification, whereby the preemphasis waveform at least partially precompensates for anticipated high-frequency energy losses in the communications cable caused by the low-pass filter characteristics of the communications cable.

2. A method as recited in claim 1 further including an initialization step of tuning the preemphasis magnitude to better compensate for the low-pass filter characteristics of the communications cable.

3. A method as recited in claim 1 further including initialization steps of tuning the first and second time periods to better compensate for the low-pass filter characteristics of the communications cable.

4. A method as recited in claim 1 further including steps of tuning the preemphasis magnitude, the first time period, and the second time period, to better compensate for the low-pass filter characteristics of the communications cable.

5. A method as recited in claim 1 wherein the preemphasis waveform has a steep-trailing edge.

6. A method as recited in claim 1 wherein the preemphasis waveform has a soft-trailing edge.

7. A method as recited in claim 1 wherein the communications signal is a differential signal and the communications cable includes a pair of wires.

8. A method as recited in claim 1 wherein the communications specification is RS-485.

9. A method as recited in claim 1 wherein the method is performed utilizing a waveform generator and a high drive buffer, the waveform generator operable to generate both the preemphasis waveform and the standard waveform, the high drive buffer suitable to drive the communications cable with the preemphasis waveform and the standard waveform.

10. A method as recited in claim 1 wherein the method is performed utilizing four switches and a controller, the four switches being a first strong switch arranged to couple the communications cable to a supply voltage, a first weak switch arranged to couple the communications cable to a supply voltage, a second strong switch arranged to couple the communications cable to a common ground reference, and a second weak switch arranged to couple the communications cable to the common ground reference.

11. A method as recited in claim 10 wherein the preemphasis waveform is generated by closing the first strong switch and opening the remaining switches.

12. A method as recited in claim 11 wherein the standard waveform is generated by closing the first weak switch and opening the remaining switches.

13. A method as recited in claim 10 wherein the preemphasis waveform is generated by closing the first weak switch and the first strong switch and opening the remaining switches.

14. A method as recited in claim 13 wherein the standard waveform is generated by closing the first weak switch and opening the remaining switches.

15. An RS-485 transmitter comprising:
a differential pair of communication channels Y and Z;
a first weak switch for coupling communication channel Y to a supply voltage;
a first strong switch for coupling communication channel Y to the supply voltage;
a second weak switch for coupling communications channel Y to a common ground reference;
a second strong switch for coupling communications channel Y to a common reference;
a control circuit for controlling the strong and the weak switches, the control circuit operable to:
during a preemphasis time period, close the first strong switch and open both the second weak and the second strong switches, thereby generating a preemphasis voltage on the communications channel Y; and
during a standard time period, close the first weak switch and open both the second weak and the second strong switches, thereby generating a standard voltage on the communications channel Y.

16. An RS-485 transmitter as recited in claim 15, the control circuit further operable to close the first weak switch during the preemphasis time period.

17. An RS-485 transmitter as recited in claim 15, the control circuit further operable to, during the preemphasis time period, open the first weak switch.

18. An RS-485 transmitter as recited in claim 15, wherein the first strong switch and the first weak switch are segmented switches of variable strength, the control circuit further operable to selectively close segments of the switches in order to generate a desired voltage level on the communications line Y.

19. An RS-485 transmitter as recited in claim 18 wherein the control circuit is operable to sense voltage on the communications channel Y and adaptively control the switches for the desired voltage level on the communications line Y.

20. An RS-485 transmitter as recited in claim 15 wherein the switches are transistors.

21. An RS-485 transmitter as recited in claim 19 wherein the transistors are MOSFETs.

22. An RS-485 transmitter comprising:
a main driver suitable for generating a binary communications signal over a communications channel Y, the main driver able to generate a binary communications signal waveform having a first segment that has a preemphasis magnitude and a second segment that has a standard magnitude, the preemphasis magnitude sufficient to compensate for low-pass filter effects of the communications channel Y;
a replicate driver that substantially mimics operation of the main driver;
a replicate load coupled to the replicate driver, the replicate load intended to simulate a load present on the communications channel Y;
an adaptive controller operating both the main driver and the replicate driver, the adaptive controller arranged to sense voltages generated by the replicate driver and update control of both the main driver and the replicate driver accordingly.

23. An RS-485 transmitter as recited in claim 22 wherein the main driver includes:
a first weak switch for coupling the communications channel Y to a supply voltage;
a first strong switch for coupling communications channel Y to the supply voltage;
a second weak switch for coupling communications channel Y to a common ground reference; and
a second strong switch for coupling communications channel Y to a common reference.

24. An RS-485 transmitter as recited in claim 23 wherein the main driver switches are transistors.

25. An RS-485 transmitter as recited in claim 24 wherein the transistors are MOSFETs.

26. An RS-485 transmitter as recited in claim 23 wherein the adaptive controller is operable to:
during a preemphasis time period, close the first strong switch and open both the second weak and the second strong switches, thereby generating the preemphasis voltage on the communications channel Y; and
during a standard time period, close the first weak switch and open both the second weak and the second strong switches, thereby generating a standard voltage on the communications channel Y.

27. An RS-485 transmitter as recited in claim 26 wherein the adaptive controller closes the first weak switch during the preemphasis time period.

28. An RS-485 transmitter as recited in claim 26 wherein the adaptive controller opens the first weak switch during the preemphasis time period.

29. An RS-485 transmitter as recited in claim 23 wherein the main driver switches are variable strength switches and the adaptive controller can update the strength of these switches in order to obtain the desired channel Y voltages.

30. An RS-485 transmitter as recited in claim 29 wherein the adaptive controller includes synchronization circuitry operable to update the main driver in a manner that will not cause electrical glitches during operation.

* * * * *